United States Patent [19]
Seamans

[11] Patent Number: 5,884,111
[45] Date of Patent: Mar. 16, 1999

[54] DEVICE FOR POSITIONING FILM CARTRIDGE IN CAMERA

[75] Inventor: Tom Seamans, Corfu, N.Y.

[73] Assignee: Eastman Kodak Company, Rochester, N.Y.

[21] Appl. No.: 17,825

[22] Filed: Feb. 3, 1998

[51] Int. Cl.$^6$ .................................................. G03B 17/24
[52] U.S. Cl. .......................................................... 396/538
[58] Field of Search .................................... 396/537, 538, 396/536

[56] References Cited

U.S. PATENT DOCUMENTS

| | | |
|---|---|---|
| 3,523,496 | 8/1970 | Nerwin . |
| 4,334,751 | 6/1982 | Jinsenji . |
| 4,641,936 | 2/1987 | Harvey et al. . |
| 5,140,354 | 8/1992 | Burnham . |
| 5,142,316 | 8/1992 | Tanii et al. . |
| 5,262,814 | 11/1993 | Nishio et al. ............................ 396/537 |
| 5,394,213 | 2/1995 | Hazama et al. . |

Primary Examiner—David M. Gray
Attorney, Agent, or Firm—Roger A. Fields

[57] ABSTRACT

A camera comprising a chamber for receiving a film cartridge of the type having a snout portion provided with a film passage opening and an exterior information-bearing portion next to the snout portion, a door movable to close the chamber and having a window for viewing the information-bearing portion, and an elastic opaque gasket positioned around the window to be compressed against the film cartridge around the information-bearing portion to light-tightly confine ambient light entering the window when the door is closed, is characterized in that the gasket has a section positioned to be compressed against the snout portion of the film cartridge when the door is closed, and the door has at least one protuberance that projects into the section of the gasket to make compression of the gasket against the film cartridge greatest at the snout portion of the cartridge. By making the compression against the film cartridge greatest at the snout portion of the cartridge, rather than evenly applied against the cartridge, the orientation of the cartridge within the chamber can not be changed from the desired one.

4 Claims, 4 Drawing Sheets

DEVICE FOR POSITIONING FILM CARTRIDGE IN CAMERA

FIELD OF THE INVENTION

The invention relates generally to the field of photography, and in particular to cameras. More specifically, the invention relates to a device for positioning a film cartridge in a camera.

BACKGROUND OF THE INVENTION

It is known for a camera to include a rearwardly open chamber for receiving a film cartridge of the type having a projecting or lip-like snout portion provided with a film passage opening and an exterior information-bearing portion next to the snout portion. A rear door of the camera is movable to close the chamber and has a window for viewing the information-bearing portion. An elastic opaque gasket is positioned around the window to be compressed evenly against the film cartridge around the information-bearing portion, in order to light-tightly confine ambient light entering the window to the vicinity of the information-bearing portion, when the door is closed. The elastic gasket is often intended to further serve to hold the film cartridge in a desired orientation within the chamber.

Two similar problems are known to possibly occur in the camera. The first problem is that, when the filmstrip is moved through the film passage opening and out of the film cartridge, the inherent longitudinal curl of the filmstrip along a film section removed from the cartridge may tend to swing the cartridge slightly about the axis of rotation of a film spool inside the cartridge. Consequently, the orientation of the cartridge within the chamber will be changed from the desired one. The second problem is that, when the film spool inside the film cartridge is rotated to rewind the filmstrip through the film passage opening and into the film cartridge, the rewinding rotation of the spool may tend to swing the cartridge to slightly about the axis of rotation of the spool. Again, the orientation of the cartridge within the chamber will be changed from the desired one.

SUMMARY OF THE INVENTION

Generally speaking, a camera comprising a chamber for receiving a film cartridge of the type having a projecting portion provided with a film passage opening, a door movable to close the chamber, and an elastic part positioned to be compressed against the film cartridge to hold the cartridge in the chamber when the door is closed, is characterized in that:

the elastic part has at least one section positioned to be compressed against the projecting portion of the film cartridge when the door is closed; and the door has at least one protuberance that projects into the section of the elastic part to make compression of the elastic part against the film cartridge greatest at the projecting portion of the cartridge.

More specifically, a camera comprising a chamber for receiving a film cartridge of the type having a snout portion provided with a film passage opening and an exterior information-bearing portion next to the snout portion, a door movable to close the chamber and having a window for viewing the information-bearing portion, and an elastic opaque gasket positioned around the window to be compressed against the film cartridge around the information-bearing portion to light-tightly confine ambient light entering the window when the door is closed, is characterized in that:

the gasket has a section positioned to be compressed against the snout portion of the film cartridge when the door is closed; and the door has at least one protuberance that projects into the section of the gasket to make compression of the gasket against the film cartridge greatest at the snout portion of the cartridge.

By making the compression against the film cartridge greatest at the projecting or snout portion of the cartridge, rather than evenly applied against the cartridge as in the known prior art, the orientation of the cartridge within the chamber can not be changed from the desired one.

DETAILED DESCRIPTION OF THE INVENTION

Figure 1:
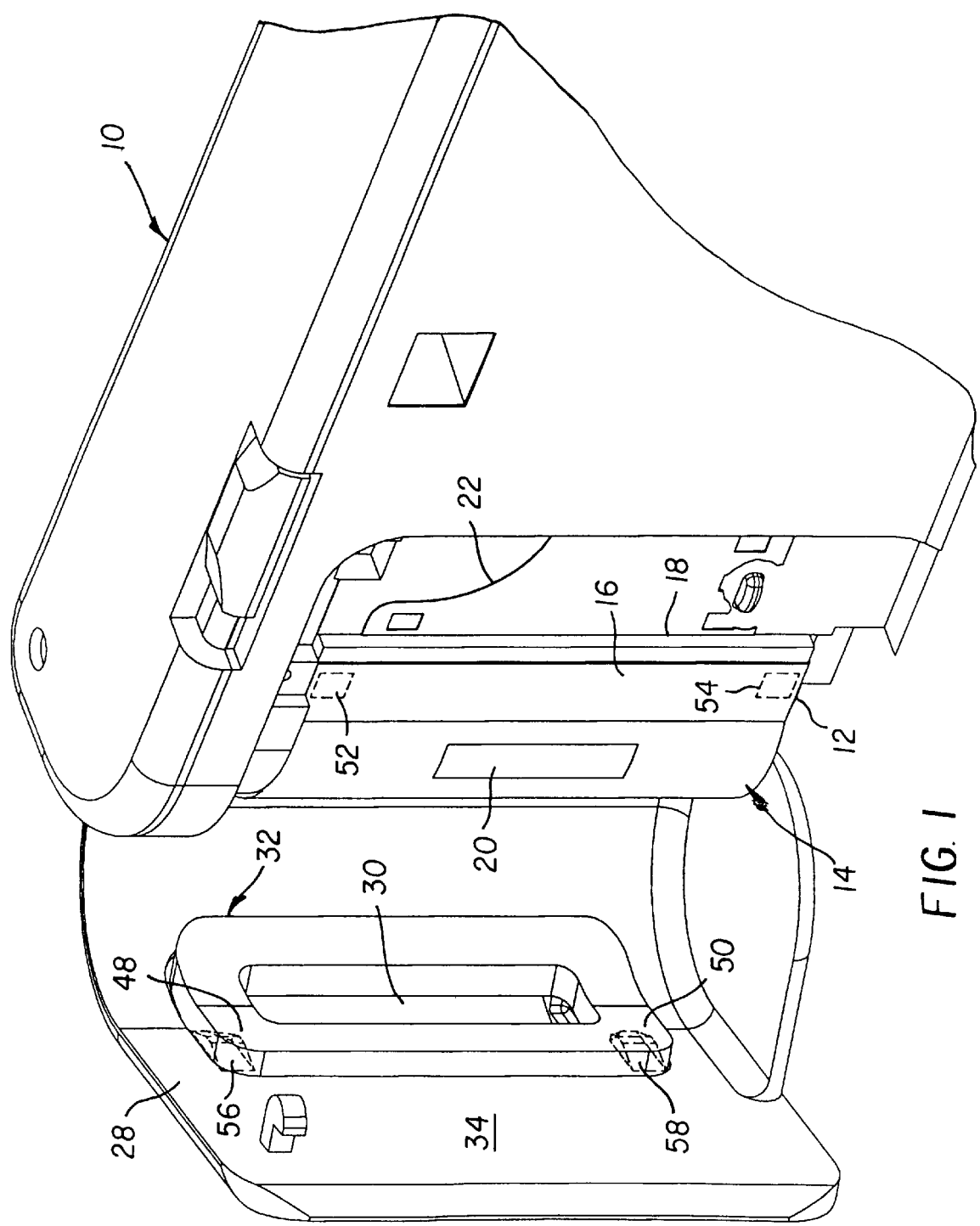
FIG. 1 is a rear perspective view of a motorized camera according to a preferred embodiment of the invention, showing a rear door opened to permit a film cartridge to be inserted into a chamber in the camera.

The invention is disclosed as being embodied preferably in a motorized camera. Because the features of a motorized camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a motorized camera 10. The camera 10 has a rearwardly open chamber 12 for receiving a film cartridge 14. The film cartridge 14 is a conventional type having a projecting or lip-like snout portion 16 provided with a film passage opening 18 to the interior of the cartridge and an exterior information-bearing portion 20 next to the snout portion. A filmstrip 22 is originally coiled about a film spool 24 rotatably supported inside the cartridge 14 and includes an integral leader section 26 that protrudes through the film passage opening 18 and out of the cartridge. A rear door 28 of the camera 10 is movable to close the chamber 12 and has a rectangular shaped window 30 for viewing the information-bearing portion 20. A similar shaped, elastic, opaque gasket 32 is positioned on an inner side 34 of the door 28, around the window 30, to be compressed against the cartridge 14 around the information-bearing portion 20, in order to light-tightly confine ambient light entering the window, when the door is closed.

Figure 3:
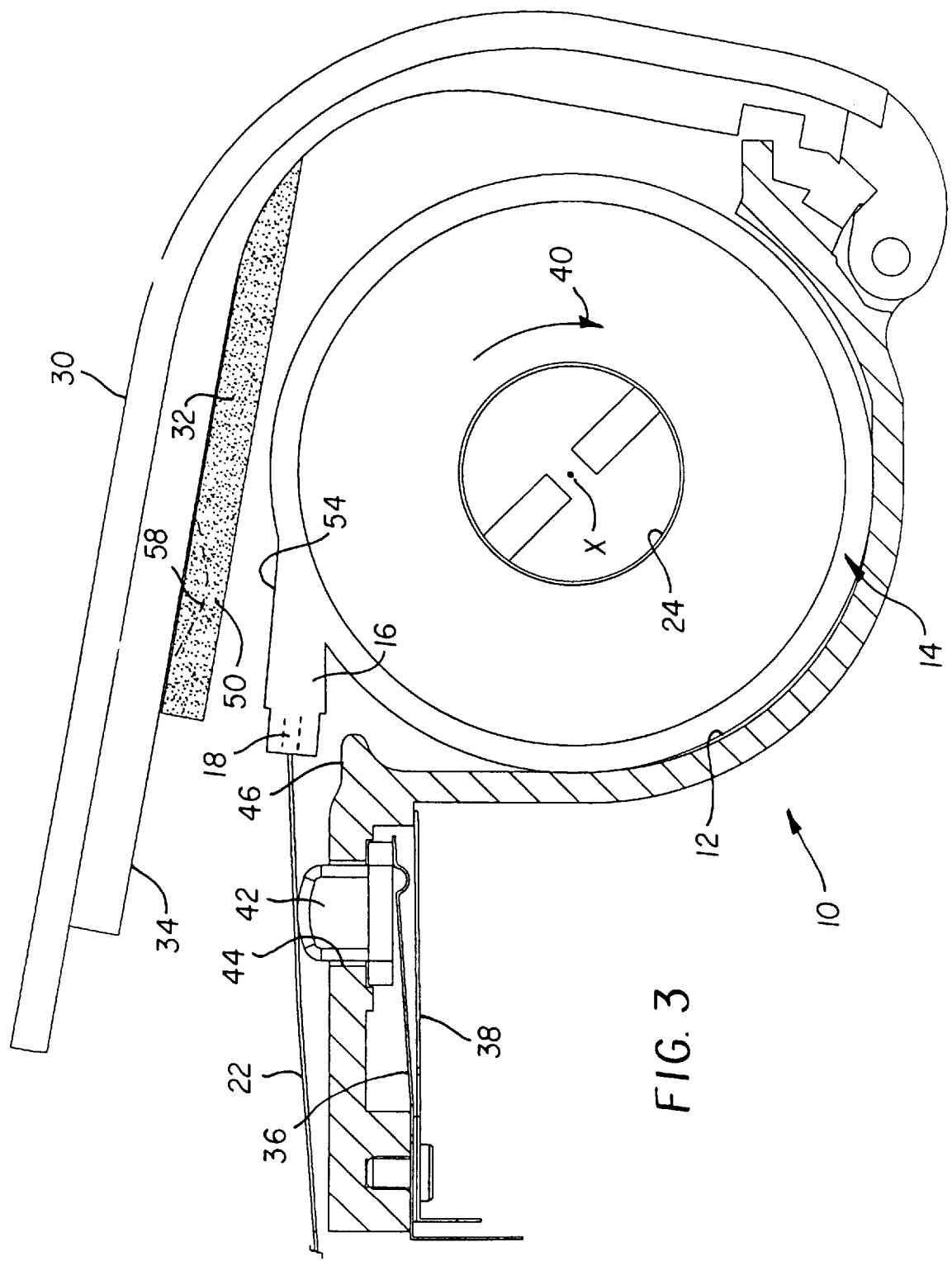
FIG. 3 is an elevation view of the rear door and the film cartridge, showing the rear door opened.
Figure 4:
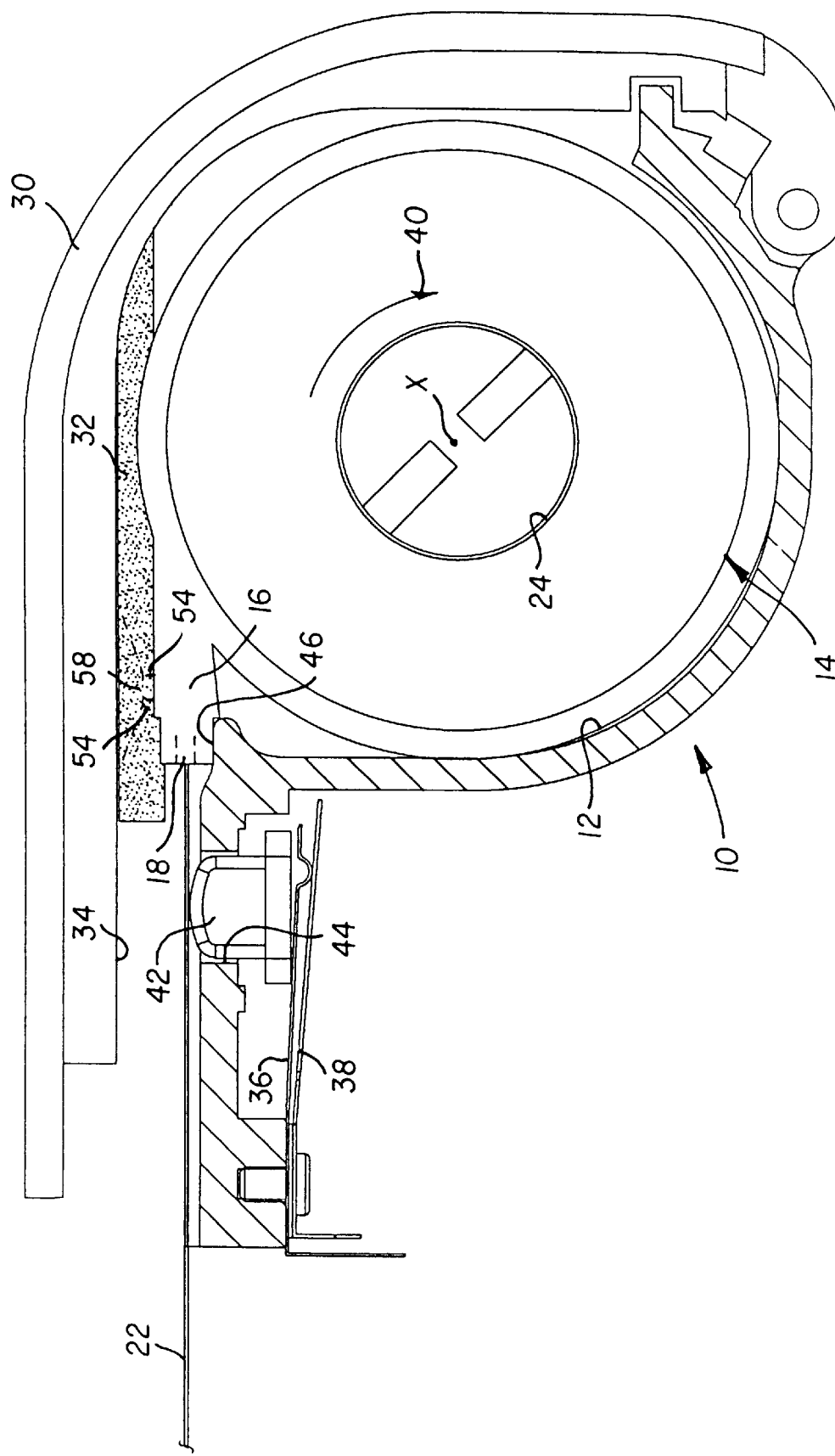
FIG. 4 is an elevation view of the rear door and the film cartridge, showing the rear door closed.

The camera 10 includes a pair of normally separated resilient switch contacts 36 and 38 that when brought together, as shown in FIG. 4, permit one to trigger film rewind. During film rewind, a drive motor (not shown) in the camera 10 is reversed to rotate the film spool 24 in a rewinding direction 40 to rewind the filmstrip 22 completely into the film cartridge 14. A film sensor button 42 is normally urged by the switch contact 36 to protrude substantially from a hole 44, as shown in FIG. 3. When the door 28 is closed and the filmstrip 24 longitudinally extends over the film sensor button 42, as shown in FIG. 4, the filmstrip substantially depresses the film sensor button into the hole 44 to bend the switch contact 36 against the switch contact 38. Then, one can trigger film rewind. Toward the completion of film rewind, the trailing end (not shown) of the filmstrip 22 will be rewound over the film sensor button 42. Once the trailing film end is rewound off the film sensor button 42, the switch contact 36 will separate from the switch contact 38 to discontinue film rewind.

The inherent curl of the filmstrip 22, when resting on the film sensor button 42, as shown in FIG. 3, tends to lift the snout portion 16 of the film cartridge 14 from a fixed datum part 46, which swings the cartridge slightly about the axis of rotation X of the film spool and in the rewinding direction 40. If this happens when the door 28 is closed, the filmstrip 22 may not be able to depress the film sensor button 42 into the hole 44 sufficiently to bend the switch contact 36 against the switch contact 38.

When the film spool 24 is rotated in the rewinding direction 40 to rewind the filmstrip 22 into the film cartridge 14, the spool rotation tends to urge the cartridge to swing slightly about the axis of rotation X of the film spool and in the rewinding direction to lift the snout portion 16 of the cartridge from the fixed datum part 46. If this happens, the filmstrip 22 may cease to depress the film sensor button 42 into the hole 44 sufficiently to maintain the switch contact 36 against the switch contact 38.

Figure 2:
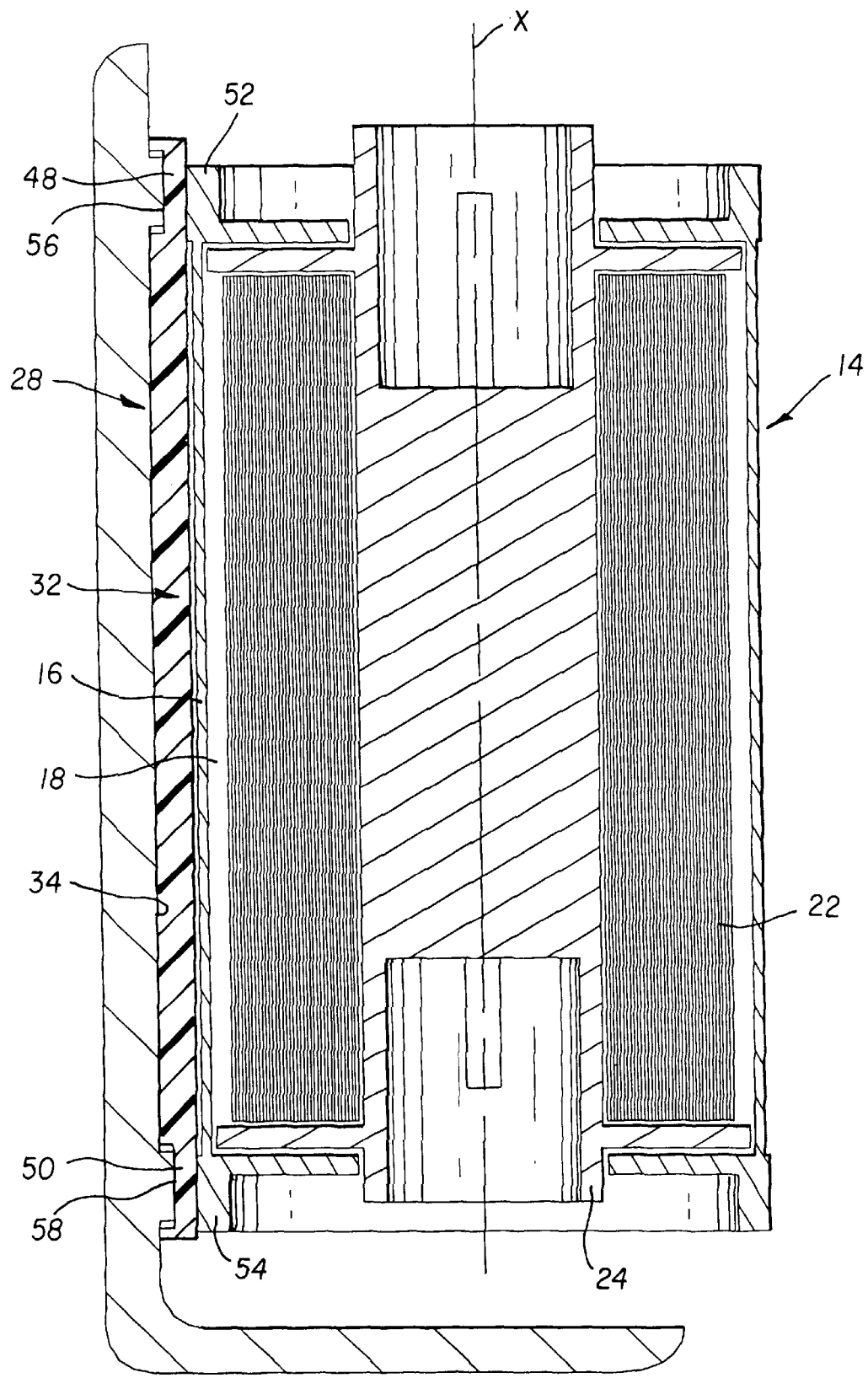
FIG. 2 is a sectional view of the rear door and the film cartridge.

To prevent these problems, the elastic gasket 32 has a pair of spaced corner sections 48 and 50 positioned to be compressed against respective corner sections 52 and 54 of the snout portion 16 of the film cartridge 14 and the door 28 has a pair of integral protuberances 56 and 58 that project into the corner sections of the elastic gasket to make compression of the elastic gasket against the cartridge greatest at its snout portion, when the door is closed. The two corner sections 52 and 54 of the snout portion 16 are remote from the film passage opening 18, as shown in FIG. 2. Consequently, when subjected to the combined pressure of the two protuberances 56 and 58 and the two gasket sections 48 and 50, the two snout sections 52 and 54 can not collapse the film passage opening 18. The combined pressure of the two protuberances 56 and 58 and the two gasket sections 48 and 50 against the two snout sections 52 and 54 when the door 28 is closed, firmly hold the snout portion 16 against the fixed datum part 46, as shown in FIGS. 2 and 4.

The invention has been described with reference to a preferred embodiment. However, it will be appreciated that variations and modifications can be effected by a person of ordinary skill in the art without departing from the scope of the invention.

PARTS LIST 10. motorized camera
12. chamber
14. film cartridge
16. protruding or lip-like snout portion
18. film passage opening
20. exterior information-bearing portion
22. filmstrip
24. film spool
26. leader section
28. door
30. window
32. elastic opaque gasket
34. inner side
36. switch contact
38. switch contact
40. rewinding direction
42. film sensor button
44. hole
46. fixed datum part
X. axis of rotation
48. gasket corner section
50. gasket corner section
52. snout corner section
54. snout corner section
56. protuberance
58. protuberance

What is claimed is:

1. A camera comprising a chamber for receiving a film cartridge of the type having a projecting portion provided with a film passage opening, a door movable to close said chamber, and an elastic part positioned to be compressed against the film cartridge to hold the cartridge in said chamber when said door is closed, is characterized in that:

said elastic part has at least one section positioned to be compressed against the projecting portion of the film cartridge when said door is closed; and said door has at least one protuberance that projects into said section of the elastic part to make compression of the elastic part against the film cartridge greatest at the projecting portion of the cartridge.

2. A camera comprising a chamber for receiving a film cartridge of the type having a projecting portion provided with a film passage opening, a door movable to close said chamber, and an elastic part positioned to be compressed against the film cartridge to hold the cartridge in said chamber when said door is closed, is characterized in that:

said elastic part has at least one section positioned to be compressed against the projecting portion of the film cartridge when said door is closed;

a fixed datum part is positioned to support the projecting portion of the film cartridge in a particular orientation within said chamber; and said door has at least one rigid protuberance that projects into said section of the elastic part to make compression of the elastic part against the film cartridge greatest at the projecting portion of the cartridge, in order to maintain the projecting portion firmly against said fixed datum part, whereby the film cartridge cannot change its orientation within said chamber when said door is closed.

3. A camera comprising a chamber for receiving a film cartridge of the type having a projecting portion provided with a film passage opening and with discrete sections that when subjected to pressure will not collapse the film passage opening, a door movable to close said chamber, and an elastic part positioned to be compressed against the film cartridge to hold the cartridge in said chamber when said door is closed, is characterized in that:

said elastic part has relatively small spaced sections positioned to be compressed against the discrete sections of the projecting portion of the film cartridge when said door is closed; and said door has respective protuberances that project into said spaced sections of the elastic part to make compression of the elastic part against the film cartridge greatest at the discrete sections of the projecting portion of the cartridge, whereby said protuberances cannot cause the film passage opening to collapse.

4. A camera comprising a chamber for receiving a film cartridge of the type having a snout portion provided with a film passage opening and an exterior information-bearing portion next to the snout portion, a door movable to close said chamber and having a window for viewing the information-bearing portion, and an elastic opaque gasket positioned around said window to be compressed against the film cartridge around the information-bearing portion to light-tightly confine ambient light entering the window when said door is closed, is characterized in that:

said gasket has a section positioned to be compressed against the snout portion of the film cartridge when said door is closed; and said door has at least one protuberance that projects into said section of the gasket to make compression of the gasket against the film cartridge greatest at the snout portion of the cartridge, rather than even applied against the cartridge.

* * * * *